United States Patent
Berry et al.

(10) Patent No.: US 8,904,748 B2
(45) Date of Patent: Dec. 9, 2014

(54) SYSTEM AND METHOD FOR PRODUCING HYDROGEN RICH FUEL

(71) Applicant: General Electric Company, Schenectady, NY (US)

(72) Inventors: Jonathan Dwight Berry, Simpsonville, SC (US); Michael John Hughes, Greer, SC (US)

(73) Assignee: General Electric Company, Schenectady, NY (US)

( * ) Notice: Subject to any disclaimer, the term of this patent is extended or adjusted under 35 U.S.C. 154(b) by 248 days.

(21) Appl. No.: 13/660,287

(22) Filed: Oct. 25, 2012

(65) Prior Publication Data

US 2013/0047628 A1  Feb. 28, 2013

Related U.S. Application Data

(62) Division of application No. 12/877,363, filed on Sep. 8, 2010, now abandoned.

(51) Int. Cl.
   *F02C 3/28* (2006.01)
   *F02C 6/00* (2006.01)
   *F02C 3/34* (2006.01)

(52) U.S. Cl.
   CPC ... *F02C 6/00* (2013.01); *F02C 3/28* (2013.01); *F02C 3/34* (2013.01)
   USPC .......................................... 60/39.12; 60/39.17

(58) Field of Classification Search
   USPC ................... 60/39.12, 39.17, 39.21
   See application file for complete search history.

(56) References Cited

U.S. PATENT DOCUMENTS

| | | | | |
|---|---|---|---|---|
| 4,064,690 | A | * | 12/1977 | Kronogard ................. 60/39.163 |
| 4,147,024 | A | * | 4/1979 | Moellmann .................. 60/39.15 |
| 4,193,259 | A | * | 3/1980 | Muenger et al. ............. 60/39.12 |
| 5,103,630 | A | | 4/1992 | Correa |
| 5,133,180 | A | * | 7/1992 | Horner et al. ................ 60/39.12 |
| 5,729,967 | A | | 3/1998 | Joos et al. |
| 5,852,927 | A | | 12/1998 | Cohn et al. |
| 5,904,040 | A | | 5/1999 | Hums et al. |
| 6,155,039 | A | | 12/2000 | Agee et al. |
| 7,739,875 | B2 | * | 6/2010 | Bartlett ........................ 60/39.12 |
| 2005/0210881 | A1 | | 9/2005 | Balan et al. |
| 2007/0044481 | A1 | * | 3/2007 | Rabovitser et al. ............ 60/784 |
| 2007/0130957 | A1 | * | 6/2007 | Hoffmann et al. ............. 60/780 |
| 2008/0028765 | A1 | * | 2/2008 | Bartlett ...................... 60/39.182 |
| 2008/0229757 | A1 | * | 9/2008 | Alexander et al. ............ 60/778 |
| 2008/0308465 | A1 | * | 12/2008 | Osaheni et al. ............... 208/253 |
| 2009/0100754 | A1 | * | 4/2009 | Gil ................................. 48/201 |
| 2009/0158701 | A1 | * | 6/2009 | Hoffmann et al. ........... 60/39.12 |
| 2010/0115962 | A1 | * | 5/2010 | Russ et al. ................. 60/39.182 |

* cited by examiner

Primary Examiner — Ted Kim
(74) Attorney, Agent, or Firm — Dority & Manning, P.A.

(57) ABSTRACT

A system for providing hydrogen enriched fuel includes first and second gas turbines. The second gas turbine receives a portion of compressed working fluid from the first gas turbine and produces a reformed fuel, and a fuel skid provides fluid communication between a turbine in the second gas turbine and a combustor in the first gas turbine. A method for providing hydrogen enriched fuel includes diverting a portion of a first compressed working fluid from a first compressor to a second compressor and providing a second compressed working fluid from the second compressor. The method further includes mixing a fuel with the second compressed working fluid in a reformer to produce a reformed fuel, flowing the reformed fuel through a second turbine to cool the reformed fuel, and connecting the second turbine to the second compressor so that the second turbine drives the second compressor.

7 Claims, 2 Drawing Sheets

SYSTEM AND METHOD FOR PRODUCING HYDROGEN RICH FUEL

RELATED APPLICATIONS

The present application is a divisional application of U.S. Application having Ser. No. 12/877,363 filed on Sep. 8, 2010, now abandoned, which is incorporated herein in its entirety by reference thereto for all purposes. Any disclaimer that may have occurred during prosecution of the above-referenced application(s) is hereby expressly rescinded.

FIELD OF THE INVENTION

The present invention relates generally to an integrated gas turbine system that produces hydrogen rich fuel for subsequent combustion or distribution.

BACKGROUND OF THE INVENTION

Gas turbines are widely used in industrial and power generation operations. A typical gas turbine includes an axial compressor at the front, one or more combustors around the middle, and a turbine at the rear. Ambient air enters the compressor, and rotating blades and stationary vanes in the compressor progressively impart kinetic energy to the working fluid (air) to produce a compressed working fluid at a highly energized state. The compressed working fluid exits the compressor and flows to the combustors where it mixes with fuel and ignites to generate combustion gases having a high temperature, pressure, and velocity. The combustion gases expand in the turbine to produce work. For example, expansion of the combustion gases in the turbine may rotate a shaft connected to a generator to produce electricity.

It is widely known that a leaner fuel-air mixture reduces the nitrous oxides produced from combustion. However, a leaner fuel-air mixture introduces flame instability in the combustor, increasing the chance of a lean blow out (LBO) event that might interrupt service provided by the gas turbine. The addition of hydrogen to the fuel can reduce the occurrence of lean blow out, improve emissions, and enhance the overall operation of most combustors, such as Dry Low NOx (DLN) combustors. Inasmuch as hydrogen is difficult to transport safely, an on-site production capability for the amount of hydrogen needed to supplement the fuel would be desirable. Various methods are known in the art for producing hydrogen on-site. For example, autothermal reformers (ATR) and steam methane reformers (SMR) may be used to produce a hydrogen enriched fuel. In general, these reformers expose a catalyst, such as nickel, to a fuel, such as natural gas, in a high temperature and pressure environment to produce pure hydrogen, and the exothermic catalytic reaction produces a very high temperature exhaust that can present a problem for valves, seals, and other system components. In addition, SMR reformers typically require an external source of steam which may not be readily available. Lastly, the pressure of the hydrogen enriched exhaust stream is generally lower than the pressure in the gas turbine combustor. As a result, a separate compressor is needed to increase the pressure of the hydrogen enriched exhaust stream so it can be injected into the combustor of the gas turbine. Therefore, an integrated gas turbine system that can produce hydrogen enriched fuel on-site would be useful.

BRIEF DESCRIPTION OF THE INVENTION

Aspects and advantages of the invention are set forth below in the following description, or may be obvious from the description, or may be learned through practice of the invention.

One embodiment of the present invention is a system for providing hydrogen enriched fuel. The system includes a first gas turbine and a second gas turbine. The first gas turbine includes a first compressor that produces a first compressed working fluid, a combustor downstream of the first compressor, and a first turbine downstream of the combustor. The second gas turbine includes a second compressor in fluid communication with the first compressor. The second compressor receives a portion of the first compressed working fluid from the first compressor and produces a second compressed working fluid having a higher pressure than the first compressed working fluid. A reformer downstream of the second compressor receives the second compressed working fluid and produces a reformed fuel. A second turbine downstream of the reformer receives the reformed fuel and produces a cooled reformed fuel. A shaft connecting the second turbine to the second compressor provides a driving engagement between the second turbine and the second compressor. A fuel skid in fluid communication with the second turbine and the combustor provides a flow path for the cooled reformed fuel from the second turbine to the combustor.

Another embodiment of the present invention is a system for providing hydrogen enriched fuel that includes a low pressure compressor, a combustor downstream of the low pressure compressor, and a low pressure turbine downstream of the combustor. The low pressure compressor produces a first compressed working fluid. A high pressure compressor in fluid communication with the low pressure compressor receives a portion of the first compressed working fluid and produces a second compressed working fluid having a higher pressure than the first compressed working fluid. A reformer downstream of the high pressure compressor receives the second compressed working fluid and produces a reformed fuel. A high pressure turbine downstream of the reformer receives the reformed fuel and produces a cooled reformed fuel. A first shaft connects the high pressure turbine to the high pressure compressor and provides a driving engagement between the high pressure turbine and the high pressure compressor. A fuel skid in fluid communication with the high pressure turbine and the combustor provides a flow path for the cooled reformed fuel from the high pressure turbine to the combustor.

The present invention also includes a method for providing hydrogen enriched fuel. The method includes diverting a portion of a first compressed working fluid from a first compressor to a second compressor and providing a second compressed working fluid from the second compressor. The method further includes mixing a fuel with the second compressed working fluid in a reformer to produce a reformed fuel, flowing the reformed fuel through a second turbine to cool the reformed fuel, and connecting the second turbine to the second compressor so that the second turbine drives the second compressor.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
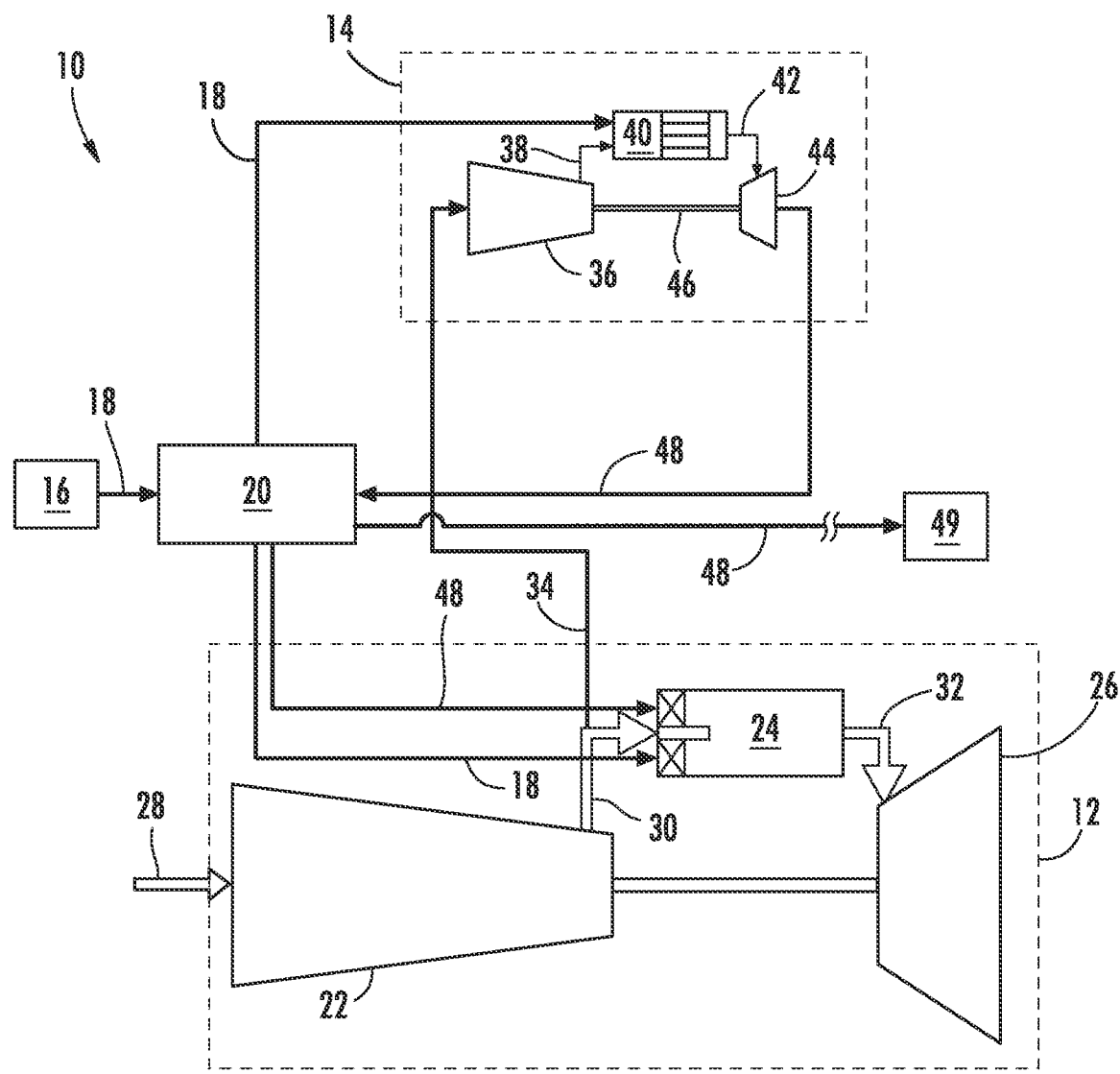
FIG. 1 provides a simplified block diagram of a system according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention utilize an integrated thermodynamic cycle to enhance the overall efficiency of a gas turbine. Specifically, the integrated thermodynamic cycle produces a reformed fuel from catalytic oxidation and recycles energy generated during the catalytic oxidation, thus improving the overall efficiency of the integrated gas turbine system.

FIG. 1 shows a system 10 according to one embodiment of the present invention. As shown, the system 10 generally includes a first or primary gas turbine 12 integrated with a second or micro-gas turbine 14. The first or primary gas turbine 12 may include any commercially available machine for combusting fuel to generate power. The second or micro-gas turbine 14 is generally an order of magnitude smaller than the first or primary gas turbine 12 and principally functions to reform or partially combust a fuel stream to produce a reformed fuel having enriched levels of hydrogen. A fuel supply 16 may supply a fuel 18 to a fuel skid 20. Possible fuels supplied to the fuel skid 20 include, for example, blast furnace gas, coke oven gas, natural gas, vaporized liquefied natural gas (LNG), and propane. The fuel skid 20 provides fluid communication for the fuel 18 to flow between the first and second gas turbines 12, 14, and/or multiple other gas turbines, as will be described.

The first gas turbine 12 generally includes a compressor 22, one or more combustors 24 downstream of the compressor 22, and a turbine 26 downstream of the combustors 24, as is known in the art. Ambient air 28 enters the compressor 22, and rotating blades and stationary vanes in the compressor 22 progressively impart kinetic energy to the working fluid (air) to produce a first compressed working fluid, designated 30, at a highly energized state. The majority of the first compressed working fluid 30 exits the compressor 22 and flows to the combustors 24 where it mixes with fuel and ignites to generate combustion gases, designated 32, having a high temperature, pressure, and velocity. The combustion gases 32 flow to the turbine 26 and expand in the turbine 26 to produce work.

A portion of the first compressed working fluid, designated 34, is diverted from the compressor 22 and/or combustors 24 to the second gas turbine 14. The diverted portion of the first compressed working fluid 34 flows to a second compressor 36 in the second gas turbine 14. Rotating blades and stationary vanes in the second compressor 36 progressively impart kinetic energy to the diverted portion of the first compressed working fluid 34 to produce a second compressed working fluid, designated 38. The second compressed working fluid 38 naturally has a higher pressure than the diverted portion of the first compressed working fluid 34.

The second compressed working fluid 38 exits the second compressor 36 and flows to a reformer 40 downstream of the second compressor 36. The reformer 40 may comprise a catalyst, combustor, or other similar device known to one of ordinary skill in the art for oxidizing fuel to produce a reformed fuel, designated 42, having increased levels of hydrogen. For example, the reformer 40 may comprise a catalytic partial oxidation (CPOX) converter that uses one or more precious metals as the catalyst. In other embodiments, the reformer 40 may comprise a combustor.

The fuel supply 16 provides the fuel 18 to the reformer 40, either directly or through the fuel skid 16 as shown in FIG. 1. The reformer 40 mixes the fuel 18 with the second compressed working fluid 38 and/or catalyst so that the fuel-to-second compressed working fluid (air) has an equivalence ratio ($\Phi$) greater than 1, and preferably greater than approximately 2, such as between approximately 2.5 and 6, to ensure a suitable hydrogen content in the reformed fuel 42. As used herein, the equivalence ratio ($\Phi$) is defined as the ratio of the fuel-to-air ratio and the stoichiometric fuel-to-air ratio. Mathematically, the equivalence ratio may be calculated as follows:

$$\Phi = \frac{\frac{m_{fuel}}{m_{air}}}{\left(\frac{m_{fuel}}{m_{air}}\right)_{st}}$$

where, m represents the mass and the suffix st stands for stoichiometric conditions.

The reformer 40 causes the fuel 18 to react with the second compressed working fluid 38 to consume or scavenge all available oxygen and produce the reformed fuel 42 having a high temperature and pressure. The temperature of the reformed fuel 42 exiting the reformer 40 may be between approximately 1400° F. and 1700° F., and the pressure of the reformed fuel 42 exiting the reformer 40 may be between approximately 300 pounds and 400 pounds, although the present invention is not limited to any particular temperature range or pressure range for the reformed fuel 42 unless specifically recited in the claims. The hydrogen content in the reformed fuel 42 may be greater than approximately 5%, 10%, or 15% by volume, depending on the particular embodiment and operational needs.

The reformed fuel 42 flows to a second turbine 44 downstream of the reformer 40. The reformed fuel 42 expands and cools in the second turbine 44 to produce work. Specifically, a second shaft 46 may connect the second turbine 44 to the second compressor 36 to provide a driving engagement between the second turbine 44 and the second compressor 36. In this manner, the work generated by the expansion of the reformed fuel 42 in the second turbine 44 may be used to power, turn, or otherwise operate the second compressor 36, thereby enhancing the efficiency of the integrated system 10. The reformed fuel 42 exits the second turbine 44 as a cooled reformed fuel 48. The temperature of the cooled reformed fuel 48 exiting the second turbine 44 may be between approximately 1000° F. and 1400° F., and the pressure of the cooled reformed fuel 48 exiting the second turbine 44 may be between approximately 200 pounds and 300 pounds, although the present invention is not limited to any particular temperature range or pressure range for the cooled reformed fuel 48 unless specifically recited in the claims. As a result, the cooled reformed fuel 48 does not require additional cooling or pressure increase before introduction to the combustors 24. The hydrogen content in the cooled reformed fuel 48 may be greater than approximately 5%, 10%, or 15% by volume, depending on the particular embodiment and operational needs.

The fuel skid 20 provides fluid communication between the second turbine 44 and the combustors 24. As a result, the cooled reformed fuel 48 may flow from the second turbine 44 through the fuel skid 16 to the combustors 24. The fuel skid 16 may provide the cooled reformed fuel 48 to the combustors 24 without any further adjustment or mixing. Alternately, or in addition, depending on the operational needs, the fuel skid 16 may mix the cooled reformed fuel 48 with fuel 18 from the fuel supply 16. In this manner, the fuel skid 20 may provide fuel 18, cooled reformed fuel 48, and/or a mixture of the two to the combustors 24. The combustors 24 ignite the various fuels provided by the fuel skid 20 to generate combustion gases 32 which expand in the turbine 26 to produce work, as previously described. As shown in FIG. 1, the fuel skid 20 may also provide fluid communication between the second turbine 44 and another gas turbine 49 other than the first gas turbine 12. This allows the system 10 to produce and supply hydrogen enriched fuel to more than one gas turbine at a site.

Figure 2:
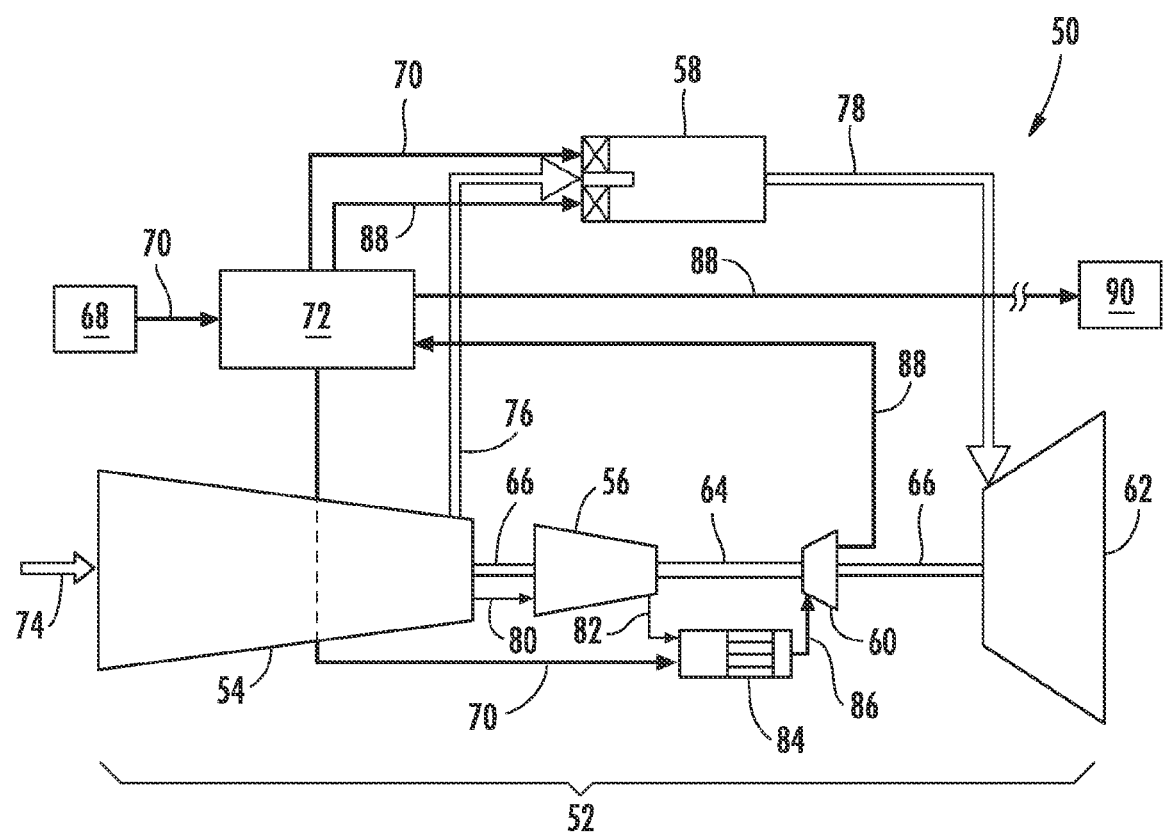
FIG. 2 provides a simplified block diagram of a system according to an alternate embodiment of the present invention.

FIG. 2 shows a system 50 according to an alternate embodiment of the present invention. As shown, the system 50 generally includes a multi-spooled gas turbine 52 having a low pressure compressor 54, a high pressure compressor 56, one or more combustors 58, a high pressure turbine 60, and a low pressure turbine 62. A first shaft 64 may connect the high pressure turbine 60 to the high pressure compressor 56, and a second shaft 66 may connect the low pressure turbine 62 to the low pressure compressor 54. The first shaft 64 may be substantially concentric with the second shaft 66. A fuel supply 68 may supply fuel 70 to a fuel skid 72. The fuel skid 72 provides fluid communication between the high pressure turbine 60, the combustors 58, and/or multiple other gas turbines, as will be described.

Ambient air 74 enters the low pressure compressor 54, and rotating blades and stationary vanes in the low pressure compressor 54 progressively impart kinetic energy to the working fluid (air) to produce a first compressed working fluid, designated 76, at a highly energized state. The majority of the first compressed working fluid 76 exits the low pressure compressor 54 and flows to the combustors 58 where it mixes with fuel and ignites to generate combustion gases, designated 78, having a high temperature, pressure, and velocity. The combustion gases 78 flow to the low pressure turbine 62 and expand in the low pressure turbine 62 to produce work.

A portion of the first compressed working fluid, designated 80, is diverted from the low pressure compressor 54 and/or combustors 58 to the high pressure compressor 56 downstream of the low pressure compressor 54. Rotating blades and stationary vanes in the high pressure compressor 56 progressively impart kinetic energy to the diverted portion of the first compressed working fluid 80 to produce a second compressed working fluid, designated 82. The second compressed working fluid 82 naturally has a higher pressure than the diverted portion of the first compressed working fluid 80.

The second compressed working fluid 82 exits the high pressure compressor 56 and flows to a reformer 84 downstream of the high pressure compressor 56. The reformer 84 may comprise a catalyst, combustor, or other similar device known to one of ordinary skill in the art for oxidizing fuel to produce a reformed fuel, designated 86, having increased levels of hydrogen. For example, the reformer 84 may comprise a catalytic partial oxidation (CPOX) converter that uses one or more precious metals as the catalyst. In other embodiments, the reformer 84 may comprise a combustor.

The fuel supply 68 provides fuel 70 to the reformer 84, either directly or through the fuel skid 72. The reformer 84 mixes the fuel 70 with the second compressed working fluid 82 and/or catalyst so that the fuel-to-second compressed working fluid (air) has an equivalence ratio ($\Phi$) greater than 1, and preferably greater than approximately 2, such as between approximately 2.5 and 6, to ensure a suitable hydrogen content in the reformed fuel 86.

The reformer 84 causes the fuel 70 to react with the second compressed working fluid 82 to consume or scavenge all available oxygen and produce the reformed fuel 86 having a high temperature and pressure. The temperature of the reformed fuel 86 exiting the reformer 84 may be between approximately 1400° F. and 1700° F., and the pressure of the reformed fuel 86 exiting the reformer 84 may be between approximately 300 pounds and 400 pounds, although the present invention is not limited to any particular temperature range or pressure range for the reformed fuel 86 unless specifically recited in the claims. The hydrogen content in the reformed fuel 86 may be greater than approximately 5%, 10%, or 15% by volume, depending on the particular embodiment and operational needs.

The reformed fuel 86 flows to the high pressure turbine 60 downstream of the reformer 84. The reformed fuel 86 expands and cools in the high pressure turbine 60 to produce work. Specifically, the first shaft 64 connecting the high pressure turbine 60 to the high pressure compressor 56 may provide a driving engagement between the high pressure turbine 60 and the high pressure compressor 56. In this manner, the work generated by the expansion of the reformed fuel 86 in the high pressure turbine 60 may be used to power, turn, or otherwise operate the high pressure compressor 56, thereby enhancing the efficiency of the integrated system 50. The reformed fuel 86 exits the high pressure turbine 60 as a cooled reformed fuel 88. The temperature of the cooled reformed fuel 88 exiting the high pressure turbine 60 may be between approximately 1000° F. and 1400° F., and the pressure of the cooled reformed fuel 88 exiting the high pressure turbine 60 may be between approximately 200 pounds and 300 pounds, although the present invention is not limited to any particular temperature range or pressure range for the cooled reformed fuel 88 unless specifically recited in the claims. As a result, the cooled reformed fuel 88 does not require additional cooling or pressure increase before introduction to the combustors 58. The hydrogen content in the reformed fuel 88 may be greater than approximately 5%, 10%, or 15% by volume, depending on the particular embodiment and operational needs.

The fuel skid 72 provides fluid communication between the high pressure turbine 60 and the combustors 58. As a result, the cooled reformed fuel 88 may flow from the high pressure turbine 60 through the fuel skid 72 to the combustors 58. The fuel skid 72 may provide the cooled reformed fuel 88 to the combustors 58 without any further adjustment or mixing. Alternately, or in addition, depending on the operational needs, the fuel skid 72 may mix the cooled reformed fuel 88 with fuel 70 from the fuel supply 68. In this manner, the fuel skid 72 may provide fuel 70, cooled reformed fuel 88, and/or a mixture of the two to the combustors 58. The combustors 58 ignite the various fuels provided by the fuel skid 72 to generate combustion gases 78 which expand in the low pressure turbine 62 to produce work, as previously described. As shown in FIG. 2, the fuel skid 72 may also provide fluid communication to another gas turbine 90 other than the multi-spooled gas turbine 52. This allows the system 50 to produce and supply hydrogen enriched fuel to more than one gas turbine at a site.

The systems described and illustrated in FIGS. 1 and 2 provide a method for providing hydrogen enriched fuel. Specifically, the method may include compressing ambient air to create a first compressed working fluid and diverting at least a portion of the first compressed working fluid for additional compression into a second compressed working fluid. The second compressed working fluid may then be mixed with a fuel in a reformer to produce a reformed fuel. If desired, the equivalence ratio between the fuel and the second compressed working fluid may be greater than 2. The reformed fuel may flow through a turbine to cool the reformed fuel, and work performed by expansion of the reformed fuel flowing through the turbine may be used to produce the second compressed working fluid. The cooled reformed fuel may then flow to a combustor for combustion. Alternately, or in addition, the cooled reformed fuel may be mixed with the fuel prior to combustion.

The systems and methods described in the present invention may provide several commercial advantages over existing technology. For example, integrating the reformer and reforming process into a conventional gas turbine system should increase the overall efficiency of the gas turbine system by allowing work performed by the reforming process to be captured or recycled. The recycling or capturing of the work from the reforming process allows for the reformed fuel to be cooled, reducing the difficulty and cost associated with transporting or transferring the reformed fuel. In addition, a single reforming process integrated into a gas turbine system they provide sufficient hydrogen enriched fuel for multiple gas turbines at a site.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal languages of the claims.

What is claimed is:

1. A system for providing hydrogen enriched fuel, comprising:
   a. a low pressure compressor, wherein the low pressure compressor produces a first compressed working fluid;
   b. a combustor downstream of the low pressure compressor;
   c. a low pressure turbine downstream of the combustor;
   d. a high pressure compressor in fluid communication with the low pressure compressor, wherein the high pressure compressor receives a portion of the first compressed working fluid and produces a second compressed working fluid having a higher pressure than the first compressed working fluid;
   e. a reformer downstream of the high pressure compressor, wherein the reformer receives the second compressed working fluid and produces a reformed fuel;
   f. a high pressure turbine downstream of the reformer, wherein the high pressure turbine receives the reformed fuel and produces a cooled reformed fuel;
   g. a fuel skid in fluid communication with the high pressure turbine, a fuel supply, and the combustor, wherein the fuel skid connects the fuel supply to the combustor and to the reformer and provides a first flow path for the cooled reformed fuel from the high pressure turbine to the combustor and a second flow path from the fuel supply to the combustor and a third flow path from the fuel supply to the reformer, wherein the fuel skid mixes the cooled reformed fuel with fuel from the fuel supply, and wherein the fuel skid provides a flow path for the cooled reformed fuel from the high pressure turbine to a third gas turbine;
   h. a first shaft connecting the high pressure turbine to the high pressure compressor and providing a driving engagement between the high pressure turbine and the high pressure compressor; and
   i. a second shaft connecting the low pressure turbine to the low pressure compressor.

2. The system as in claim 1, wherein the cooled reformed fuel comprises at least 5% by volume hydrogen.

3. The system as in claim 1, wherein the reformer comprises a catalyst.

4. The system as in claim 1, wherein the first shaft is substantially concentric with the second shaft.

5. A system for providing hydrogen enriched fuel, comprising:
   a. a low pressure compressor, wherein the low pressure compressor produces a first compressed working fluid;
   b. a combustor downstream of the low pressure compressor;
   c. a low pressure turbine downstream of the combustor;
   d. a high pressure compressor co-axially aligned with the low pressure compressor, wherein the high pressure compressor receives a portion of the first compressed working fluid and produces a second compressed working fluid having a higher pressure than the first compressed working fluid;
   e. a reformer downstream of the high pressure compressor, wherein the reformer receives the second compressed working fluid and produces a reformed fuel;
   f. a high pressure turbine downstream of the reformer, wherein the high pressure turbine receives the reformed fuel and produces a cooled reformed fuel;
   g. a fuel skid in fluid communication with the high pressure turbine, a fuel supply, and the combustor, wherein the fuel skid connects the fuel supply to the combustor and to the reformer and provides a first flow path for the cooled reformed fuel from the high pressure turbine to the combustor and a second flow path from the fuel supply to the combustor and a third flow path from the fuel supply to the reformer, wherein the fuel skid mixes the cooled reformed fuel with fuel from the fuel supply, and wherein the fuel skid provides a flow path for the cooled reformed fuel from the high pressure turbine to a third gas turbine.

6. The system as in claim 5, wherein the cooled reformed fuel comprises at least 5% by volume hydrogen.

7. The system as in claim 5, wherein the reformer comprises a catalyst.

* * * * *